(12) United States Patent
Brueck et al.

(10) Patent No.: US 11,139,093 B2
(45) Date of Patent: Oct. 5, 2021

(54) MAGNETOCALORIC MATERIALS COMPRISING MANGANESE, IRON, SILICON, PHOSPHORUS AND NITROGEN

(71) Applicant: BASF SE, Ludwigshafen am Rhein (DE)

(72) Inventors: Ekkehard Brueck, Delft (NL); Van Thang Nguyen, Quy Nhon (VN); Xue-Fei Miao, Nanjing (CN)

(73) Assignees: Technische Universiteit Delft, Delft (NL); Stichting FOM, Utrecht (NL)

( * ) Notice: Subject to any disclaimer, the term of this patent is extended or adjusted under 35 U.S.C. 154(b) by 507 days.

(21) Appl. No.: 15/770,820

(22) PCT Filed: Oct. 28, 2016

(86) PCT No.: PCT/EP2016/076158
§ 371 (c)(1),
(2) Date: Apr. 25, 2018

(87) PCT Pub. No.: WO2017/072334
PCT Pub. Date: May 4, 2017

(65) Prior Publication Data
US 2018/0315525 A1    Nov. 1, 2018

(30) Foreign Application Priority Data

Oct. 30, 2015    (EP) ..................................... 15192313

(51) Int. Cl.
*H01F 1/01*    (2006.01)
*C01G 49/00*    (2006.01)

(52) U.S. Cl.
CPC .......... *H01F 1/015* (2013.01); *C01G 49/009* (2013.01); *C01P 2002/30* (2013.01); *C01P 2002/72* (2013.01)

(58) Field of Classification Search
None
See application file for complete search history.

(56) References Cited

U.S. PATENT DOCUMENTS

| | | |
|---|---|---|
| 2006/0117758 A1 | 6/2006 | Brueck et al. |
| 2011/0037342 A1 | 2/2011 | Degen et al. |
| 2011/0167837 A1 | 7/2011 | Reesink et al. |
| 2011/0220838 A1 | 9/2011 | Brueck et al. |

FOREIGN PATENT DOCUMENTS

| | | |
|---|---|---|
| EP | 1599884 | 11/2005 |
| WO | WO 2009/133047 A2 | 11/2009 |
| WO | WO 2015/018610 A1 | 2/2015 |
| WO | WO 2015/018678 A1 | 2/2015 |
| WO | WO 2015/018705 A1 | 2/2015 |

OTHER PUBLICATIONS

International Search Report dated Feb. 13, 2017, in PCT/EP2016/076158, filed Oct. 28, 2016.

(Continued)

*Primary Examiner* — Anthony M Liang
(74) *Attorney, Agent, or Firm* — Oblon, McClelland, Maier & Neustadt, L.L.P.

(57) ABSTRACT

The present invention relates to magnetocaloric materials comprising manganese, iron, silicon, phosphorus, nitrogen and optionally boron.

14 Claims, 6 Drawing Sheets

(56) References Cited

OTHER PUBLICATIONS

Cui, W.B. et al., "Interstitial-nitrogen effect on phase transition and magnetocaloric effect in Mn(As,Si) (invited)", Journal of Applied Physics, vol. 107, No. 9, May 3, 2010, 4 pages, XP 012134288.
Guillou, F. et al., "Taming the First-Order Transition in Giant Magnetocaloric Materials", Advanced Materials, vol. 26, No. 12, May 22, 2014, pp. 2671-2675, XP055143389.
Guillou, F. et al., "Boron addition in MnFe(P,Si) magnetocaloric materials: interstitial vs. substitution scenarii", Physica Status Solidi. C: Current topics in solid state physics, vol. 11, No. 5-6, May 27, 2014, pp. 1007-1010, XP055250628.
Balli, M., et al. "Effect of interstitial nitrogen on magnetism and entropy change of $LaFe_{11.7}Si_{1.3}$ compound", Journal of Magnetism and Magnetic Materials, vol. 321, No. 2, Jan. 1, 2009, pp. 123-125, XP025589927.
Combined Office Action and Search Report dated Jul. 29, 2019 in Chinese Patent Application No. 201680062668.6 (with English translation of categories of cited documents).

MAGNETOCALORIC MATERIALS COMPRISING MANGANESE, IRON, SILICON, PHOSPHORUS AND NITROGEN

The present invention relates to magnetocaloric materials comprising manganese, iron, silicon, phosphorus, nitrogen and optionally boron, to processes for producing said magnetocaloric materials, to the use of said magnetocaloric materials in a device selected from the group consisting of cooling systems, heat exchangers, heat pumps, thermomagnetic generators and thermomagnetic switches, and to corresponding devices comprising at least one magnetocaloric material according to the present invention.

Magnetocaloric materials are materials exhibiting a magnetocaloric effect, i.e. a temperature change caused by exposing said material to a changing external magnetic field. Application of an external magnetic field to a magnetocaloric material at an ambient temperature in the vicinity of the Curie temperature of said magnetocaloric material causes an alignment of the randomly aligned magnetic moments of the magnetocaloric material and thus a magnetic phase transition, which can also be described as an induced increase of the Curie temperature of the material above said ambient temperature. This magnetic phase transition implies a loss in magnetic entropy and under adiabatic conditions leads to an increase in the entropy contribution of the crystal lattice of the magnetocaloric material by phonon generation. As a result of applying the external magnetic field, therefore, a heating of the magnetocaloric material occurs.

In technical applications of the magnetocaloric effect, the generated heat is removed from the magnetocaloric material by heat transfer to a heat sink in the form of a heat transfer medium, e.g. water. Subsequent removing of the external magnetic field can be described as a decrease of the Curie temperature back below the ambient temperature, and thus allows the magnetic moments to revert to a random arrangement. This causes an increase of the magnetic entropy and a reduction of the entropy contribution of the crystal lattice of the magnetocaloric material itself, and in adiabatic process conditions thus results in a cooling of the magnetocaloric material below the ambient temperature. The described process cycle including magnetization and demagnetization is typically performed periodically in technical applications.

An important class of magnetocaloric materials are compounds which comprise manganese, iron, silicon and phosphorus. Such materials and a process for the preparation thereof are generally described in WO 2004/068512. US 2011/0167837 and US 2011/0220838 disclose magnetocaloric materials consisting of manganese, iron, silicon and phosphorus. WO 2015/018610, WO 2015/018705 and WO 2015/018678 disclose magnetocaloric materials consisting of manganese, iron, silicon, phosphorus and boron.

WO 2009/133047 A2 discloses inter alia magnetocaloric materials selected from compounds of formula (I)

$(A_yB_{1-y})_{2+\delta}C_wD_xE_z$ (I), wherein
A is Mn or Co,
B is Fe, Cr or Ni,
C, D, and E have a non-vanishing concentration and are selected from the group consisting of P, B, Se, Ge, Ga, Si, Sn, N, As, and Sb, whereby at least two of C, D, and E are different, and at least one of C, D, and E is Ge or Si,
δ is a number in a range from −0.1 to 0.1, and
w, x, y, z are numbers in a range from 0 to 1, where w+x+z=1.

Related art is also:
- W. B. Cui et al.: "Interstitial-nitrogen effect on phase transition and magnetocaloric effect in Mn (As, Si) (invited)", JOURNAL OF APPLIED PHYSICS, vol. 107, no. 9, 3 May 2010, pages 9A938-9A938;
- F. Guillou et al.: "Taming the First-Order Transition in Giant Magnetocaloric Materials", ADVANCED MATERIALS, vol. 26, no. 17, 22 May 2014, pages 2671-2675;
- F. Guillou et al.: "Boron addition in MnFe (P, Si) magnetocaloric material: interstitial vs. substitutional scenarii", PHYSICA STATUS SOLIDI C, vol. 11, no. 5-6, 27 May 2014, pages 1007-1010;
- M. Balli et al.: "Effect of interstitial nitrogen on magnetism and entropy change of LaFe11.2Si1.3 compound", JOURNAL OF MAGNETISM AND MAGNETIC MATERIALS, vol. 321, no. 2, 1 Jan. 2009, pages 123-125.

Figure 1:
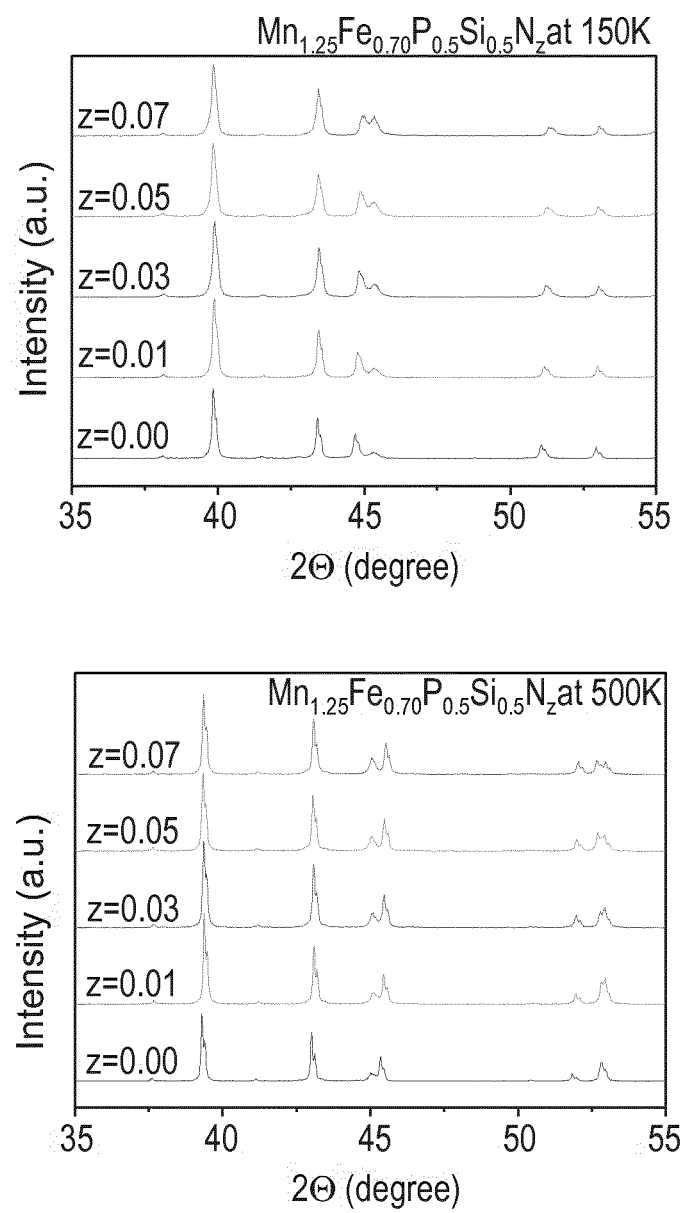
FIG. 1 shows the powder X-ray diffraction (XRD) patterns measured at 150 and 500 K (in the ferromagnetic and paramagnetic state, respectively) of materials of formula $Mn_{1.25}Fe_{0.70}P_{0.5}Si_{0.5}N_z$ with z=0.00, 0.01, 0.03, 0.05 and 0.07.

It was the object of the present invention to provide new magnetocaloric materials having advantageous properties which facilitate technical application of the magnetocaloric effect. Therefore, according to the present invention, there is provided a magnetocaloric material comprising
manganese, and
iron, and
silicon, and
phosphorus, and
nitrogen.

Surprisingly it has been found that in magnetocaloric materials which comprise manganese, iron, silicon and phosphorus the presence of nitrogen atoms enhances the mechanical stability, compared to magnetocaloric materials comprising manganese, iron, silicon and phosphorus which do not comprise nitrogen atoms. This is evident from the behavior of pristine magnetocaloric materials according to the invention when they are cooled in liquid nitrogen to remove the virgin effect. When cooled in liquid nitrogen, magnetocaloric materials according to the invention remain in their physical form, compared to pristine magnetocaloric materials consisting of iron, manganese, silicon and phosphorus (i.e. not containing nitrogen) which are easily fragmented.

Mechanical stability of magnetocaloric materials is an important issue for the following reasons: The magnetocaloric effect is most pronounced when the corresponding magnetic phase transition has a first order nature. This is due to the discontinuous change in magnetization when the magnetic transition is of first order. On the other hand, first order magnetic transitions lead to discontinuities of other physical parameters of the material, including the parameters of the elementary cell in case of magnetocaloric materials having a crystalline structure. This gives rise to symmetry breaking, change of the volume of the elementary cell, anisotropic change of cell parameters etc. During thermal or magnetic field cycling, the strains generated by a volume change of the elementary cell may lead to fractures or even a destruction of the bulk piece of the magnetocaloric material, which is not acceptable in technical applications. Therefore, magnetocaloric materials are desired which exhibit a magnetic phase transition of first order nature and a very small volume change of the elementary cell during the magnetic phase transition.

Furthermore, it has been found that it is possible to adjust important parameters of the magnetocaloric behavior like the Curie temperature Tc, the magnetic entropy change $\Delta S_m$ and the thermal hysteresis $\Delta T_{hys}$ by varying the amount of nitrogen (and optionally boron).

Specific preferred magnetocaloric materials of the present invention further comprise boron. Accordingly, specific preferred magnetocaloric materials of the present invention comprise manganese, and
iron, and
silicon, and
phosphorus, and
nitrogen, and
boron.

Particularly preferred magnetocaloric materials of the present invention consist of manganese, and
iron, and
silicon, and
phosphorus, and
nitrogen.

Other particularly preferred magnetocaloric materials of the present invention consist of manganese, and
iron, and
silicon, and
phosphorus, and
nitrogen, and
boron.

Typically a magnetocaloric material according to the present invention exhibits a hexagonal Fe$_2$P structure with a crystal lattice exhibiting the space group P-62m. Corresponding structures are described by M. Bacmann et al. in Journal of Magnetism and Magnetic Materials 134 (1994) 59-67 for magnetocaloric materials of the composition MnFeP$_{1-y}$As$_y$.

A material exhibiting a hexagonal Fe$_2$P structure with a crystal lattice exhibiting the space group P-62m is herein understood as a material comprising a main phase which occupies 90 vol.-% or more of the volume of the material, wherein said main phase has a hexagonal Fe$_2$P-structure with a crystal lattice exhibiting the space group P-62m. The existence of the hexagonal Fe$_2$P-structure with a crystal lattice exhibiting the space group P-62m is confirmed by X-ray diffraction patterns.

Preferably, a magnetocaloric material according to the present invention exhibits a hexagonal crystalline structure of the Fe$_2$P type with a crystal lattice exhibiting the space group P-62m wherein nitrogen atoms occupy crystal sites and/or interstitial sites of said crystal lattice. If boron atoms are present in said preferred magnetocaloric materials the boron atoms occupy exclusively crystal sites of said crystal lattice with the space group P-62m, i.e. there are no boron atoms on interstitial sites of said crystal lattice.

Formally, certain preferred magnetocaloric materials of the present invention can be considered as being derived from a corresponding parent material which exhibits a hexagonal Fe$_2$P structure with a crystal lattice exhibiting the space group P-62m and consists of iron, manganese, phosphorus and silicon (i.e. which contains neither nitrogen nor boron). In said preferred magnetocaloric materials of the present invention, those nitrogen atoms which occupy crystal sites of the hexagonal Fe$_2$P structure with a crystal lattice exhibiting the space group P-62m replace phosphorus atoms or silicon atoms of the corresponding parent material, and those nitrogen atoms which occupy interstitial sites are present in addition to the phosphorus atoms and silicon atoms of the corresponding parent material. The ratio of iron atoms and manganese atoms of the corresponding parent material remains unchanged. If boron atoms are present in said preferred magnetocaloric materials they occupy exclusively crystal sites thereby replacing further phosphorus atoms or silicon atoms of the corresponding parent material which consists of iron, manganese, phosphorus and silicon.

In a first group of preferred magnetocaloric materials according to the present invention, nitrogen atoms occupy crystal sites of said crystal lattice with the space group P-62m. Preferably, in said first group of preferred magnetocaloric materials according to the present invention nitrogen atoms occupy crystal sites selected from the group consisting of 1b and 2c sites of the crystal lattice. In said first group of preferred magnetocaloric materials according to the present invention no interstitial sites are occupied by nitrogen atoms. Preferably, a magnetocaloric material of said first group of preferred magnetocaloric materials according to the present invention consists of manganese, iron, silicon, phosphorus and nitrogen.

In a second group of preferred magnetocaloric materials according to the present invention, nitrogen atoms occupy interstitial sites of said crystal lattice with the space group P-62m. Preferably, in said second group of preferred magnetocaloric materials according to the present invention nitrogen atoms occupy interstitial sites selected from the group consisting of 6k and 6j sites of the crystal lattice. In said second group of preferred magnetocaloric materials according to the present invention no crystal sites are occupied by nitrogen atoms. Preferably, a magnetocaloric material of said second group of preferred magnetocaloric materials according to the present invention consists of manganese, iron, silicon, phosphorus and nitrogen.

In a third group of preferred magnetocaloric materials according to the present invention, nitrogen atoms occupy crystal sites (preferably crystal sites selected from the group consisting of 1b and 2c sites) of said crystal lattice with the space group P-62m and interstitial sites (preferably interstitial sites selected from the group consisting of 6k and 6j sites) of said crystal lattice with the space group P-62m.

Preferably, a magnetocaloric material of said third group of preferred magnetocaloric materials according to the present invention consists of manganese, iron, silicon, phosphorus and nitrogen.

In a fourth group of preferred magnetocaloric materials according to the present invention, nitrogen atoms occupy crystal sites of said crystal lattice with the space group P-62m and boron atoms occupy crystal sites of said crystal lattice with the space group P-62m. Preferably, in said fourth group of preferred magnetocaloric materials according to the present invention nitrogen atoms occupy crystal sites selected from the group consisting of 1b and 2c sites of the crystal lattice, and/or boron atoms occupy 1b crystal sites of said crystal lattice. In said fourth group of preferred magnetocaloric materials according to the present invention no interstitial sites are occupied by atoms of any of nitrogen and boron. Preferably, a magnetocaloric material of said fourth group of preferred magnetocaloric materials according to the present invention consists of manganese, iron, silicon, phosphorus, nitrogen and boron.

In a fifth group of preferred magnetocaloric materials according to the present invention, nitrogen atoms occupy interstitial sites of said crystal lattice with the space group P-62m and boron atoms occupy crystal sites of said crystal lattice with the space group P-62m. Preferably, in said fifth group of preferred magnetocaloric materials according to the present invention nitrogen atoms occupy interstitial sites selected from the group consisting of 6k and 6j sites of the crystal lattice, and/or boron atoms occupy 1b crystal sites of said crystal lattice. In said fifth group of preferred magnetocaloric materials according to the present invention no crystal sites are occupied by nitrogen atoms and no interstitial sites are occupied by boron atoms. Preferably, a magnetocaloric material of said fifth group of preferred magnetocaloric materials according to the present invention consists of manganese, iron, silicon, phosphorus, nitrogen and boron.

In a sixth group of preferred magnetocaloric materials according to the present invention, nitrogen atoms occupy crystal sites (preferably crystal sites selected from the group consisting of 1b and 2c sites) of said crystal lattice with the space group P-62m and interstitial sites (preferably interstitial sites selected from the group consisting of 6k and 6j sites) of said crystal lattice with the space group P-62m and boron atoms occupy crystal sites (preferably 1b crystal sites) of said crystal lattice with the space group P-62m. No interstitial sites are occupied by boron atoms. Preferably, a magnetocaloric material of said sixth group of preferred magnetocaloric materials according to the present invention consists of manganese, iron, silicon, phosphorus, nitrogen and boron.

Preferred magnetocaloric materials according to the present invention consist of manganese, iron, silicon, phosphorus, nitrogen and optionally boron and have a composition according to the general formula (I)

  (I)

wherein
$-0.1 \leq u \leq 0.1$, preferably $-0.05 \leq u \leq 0.05$
$0.2 \leq x \leq 0.8$, preferably $0.3 \leq x \leq 0.7$, more preferably $0.35 \leq x \leq 0.65$
$0.3 \leq y \leq 0.75$, preferably $0.4 \leq y \leq 0.7$
$0.25 \leq v \leq 0.7$, preferably $0.3 \leq v \leq 0.6$
$0.001 \leq z \leq 0.1$, preferably $0.005 \leq z \leq 0.07$, more preferably $0.01 \leq z \leq 0.04$
$0 \leq w \leq 0.1$, preferably $0.04 \leq w \leq 0.08$
$y+v+w \leq 1$
$y+v+z+w \geq 1$.

If no boron is present ($w=0$) and nitrogen atoms are present only on crystal sites (i.e. no nitrogen atoms are on interstitial sites) then $y+v<1$ and $y+v+z=1$. Those preferred magnetocaloric materials according to formula (I) belong to the above-defined first group of preferred magnetocaloric materials according to the present invention.

If no boron is present ($w=0$) and nitrogen atoms are present only on interstitial sites (i.e. no nitrogen atoms are on crystal sites) then $y+v=1$ and $y+v+z>1$. Those preferred magnetocaloric materials according to formula (I) belong to the above-defined second group of preferred magnetocaloric materials according to the present invention.

If no boron is present ($w=0$) and nitrogen atoms are present on crystal sites and on interstitial sites then $y+v<1$ and $y+v+z>1$. Those preferred magnetocaloric materials according to formula (I) belong to the above-defined third group of preferred magnetocaloric materials according to the present invention.

If boron is present ($w>0$) the boron atoms occupy exclusively crystal sites.

If boron is present ($w>0$) and nitrogen atoms are present only on crystal sites (i.e. no nitrogen atoms are on interstitial sites) then $y+v+w<1$ and $y+v+z+w=1$. Those preferred magnetocaloric materials according to formula (I) belong to the above-defined fourth group of preferred magnetocaloric materials according to the present invention.

If boron is present ($w>0$) and nitrogen atoms are present only on interstitial sites (i.e. no nitrogen atoms are on crystal sites) then $y+v+w=1$ and $y+v+z+w>1$. Those preferred magnetocaloric materials according to formula (I) belong to the above-defined fifth group of preferred magnetocaloric materials according to the present invention.

If boron is present ($w>0$) and nitrogen atoms are present on crystal sites and on interstitial sites then $y+v+w<1$ and $y+v+z+w>1$. Those preferred magnetocaloric materials according to formula (I) belong to the above-defined sixth group of preferred magnetocaloric materials according to the present invention.

In certain cases, preferred magnetocaloric materials according to the present invention consist of manganese, iron, silicon, phosphorus and nitrogen and have a composition according to the general formula (II)

  (II)

wherein
$-0.1 \leq u \leq 0.1$, preferably $-0.05 \leq u \leq 0.05$
$0.2 \leq x \leq 0.8$, preferably $0.3 \leq x \leq 0.7$, more preferably $0.35 \leq x \leq 0.65$
$0.3 \leq y \leq 0.75$, preferably $0.4 \leq y \leq 0.7$
$0.25 \leq v \leq 0.7$, preferably $0.3 \leq v \leq 0.6$
$0.001 \leq z \leq 0.1$, preferably $0.005 \leq z \leq 0.07$, more preferably $0.01 \leq z \leq 0.04$
$y+v \leq 1$
$y+v+z \geq 1$.

If nitrogen atoms are present only on crystal sites (i.e. no nitrogen atoms are on interstitial sites) then $y+v<1$ and $y+v+z=1$. Those preferred magnetocaloric materials according to formula (II) belong to the above-defined first group of preferred magnetocaloric materials according to the present invention.

If nitrogen atoms are present only on interstitial sites (i.e. no nitrogen atoms are on crystal sites) then $y+v=1$ and $y+v+z>1$. Those preferred magnetocaloric materials according to formula (II) belong to the above-defined second group of preferred magnetocaloric materials according to the present invention.

If nitrogen atoms are present on crystal sites and on interstitial sites then y+v<1 and y+v+z>1. Those preferred magnetocaloric materials according to formula (II) belong to the above-defined third group of preferred magnetocaloric materials according to the present invention.

Particularly preferred magnetocaloric materials according to the present invention consist of manganese, iron, silicon, phosphorus and nitrogen and have a composition according to the general formula (III)

$$(Mn_xFe_{1-x})_{2+u}P_ySi_{1-y}N_z \qquad (III)$$

wherein
−0.1≤u≤0.1, preferably −0.05≤u≤0.05
0.2≤x≤0.8, preferably 0.3≤x≤0.7, more preferably 0.35≤x≤0.65
0.3≤y≤0.75, preferably 0.4≤y≤0.7
0.001≤z≤0.1, preferably 0.005≤z≤0.07, more preferably 0.01≤z≤0.04

In the magnetocaloric materials according to formula (III) nitrogen atoms are present only on interstitial sites (i.e. no nitrogen atoms are on crystal sites).

Other particularly preferred magnetocaloric materials according to the present invention consist of manganese, iron, silicon, phosphorus and nitrogen and have a composition according to the general formula (IV)

$$(Mn_xFe_{1-x})_{2+u}P_ySi_{1-y-z}N_z \qquad (IV)$$

wherein
−0.1≤u≤0.1, preferably −0.05≤u≤0.05
0.2≤x≤0.8, preferably 0.3≤x≤0.7, more preferably 0.35≤x≤0.65
0.3≤y≤0.75, preferably, 0.4≤y≤0.7
0.001≤z≤0.1, preferably 0.005≤z≤0.07, more preferably 0.01≤z≤0.04

In the magnetocaloric materials according to formula (IV) nitrogen atoms are present only on crystal sites (i.e. no nitrogen atoms are on interstitial sites).

Specifically preferred magnetocaloric materials of the present invention are those selected from the group consisting of
$Mn_{1.25}Fe_{0.7}P_{0.5}Si_{0.5}N_{0.01}$
$Mn_{1.25}Fe_{0.7}P_{0.5}Si_{0.5}N_{0.03}$
$Mn_{1.25}Fe_{0.7}P_{0.49}Si_{0.5}N_{0.01}$
$Mn_{1.25}Fe_{0.7}P_{0.5}Si_{0.49}N_{0.01}$
$Mn_{1.25}Fe_{0.7}P_{0.5}Si_{0.5}N_{0.05}$
$Mn_{1.25}Fe_{0.7}P_{0.5}Si_{0.5}N_{0.07}$
$Mn_{1.25}Fe_{0.7}P_{0.47}Si_{0.5}N_{0.03}$
$Mn_{1.25}Fe_{0.7}P_{0.43}Si_{0.5}N_{0.07}$
$MnFe_{0.95}P_{0.45}Si_{0.55}N_{0.02}$
$MnFe_{0.95}P_{0.44}Si_{0.50}B_{0.06}N_{0.02}$
$Mn_{1.25}Fe_{0.70}P_{0.47}Si_{0.53}N_{0.01}$.

Preferred magnetocaloric materials according to the present invention exhibit
a Curie temperature Tc in the range of from 80 K to 500 K, preferably in the range of from 230 K to 340 K,
and/or
a magnetic entropy change $\Delta S_m$ of 6 J kg$^{-1}$ K$^{-1}$ or more, preferably of 9 J kg$^{-1}$ K$^{-1}$ or more, more preferably of 12 J kg$^{-1}$ K$^{-1}$ or more, in each case at a magnetic field change of 1 Tesla
and/or
a thermal hysteresis $\Delta T_{hys}$ of 10 K or less, preferably of 5 K or less, more preferably of 3 K or less, in each case in zero magnetic field at a sweep rate of 2 K/min
and/or
a volume change of the elementary cell during the magnetic phase transition of 1% or less, preferably of 0.2% or less.

Preferred magnetocaloric materials according to the present invention are those which exhibit two or more of the above-defined preferred features in combination. Specifically preferred magnetocaloric materials according to the present invention exhibit
a Curie temperature Tc in the range of from 80 K to 500 K, preferably in the range of 230 K to 340 K,
and
a magnetic entropy change $\Delta S_m$ of 6 J kg$^{-1}$ K$^{-1}$ or more, preferably of 9 J kg$^{-1}$ K$^{-1}$ or more, more preferably of 12 J kg$^{-1}$ K$^{-1}$ or more, in each case at a magnetic field change of 1 Tesla
and
a thermal hysteresis $\Delta T_{hys}$ of 10 K or less, preferably of 5 K or less, more preferably of 3 K or less, in each case in zero magnetic field at a sweep rate of 2 K/min
and
a volume change of the elementary cell during the magnetic phase transition of 1% or less, preferably of 0.2% or less.

The Curie temperature Tc and the thermal hysteresis $\Delta T_{hys}$ are determined from differential scanning calorimetry (DSC) zero field measurements. The magnetic entropy change $\Delta S_m$ is derived from the isofield magnetization measurements using the Maxwell relation. The volume change of the elementary cell during the magnetic phase transition is determined from X-ray diffraction patterns as a function of temperature in a temperature range around $T_C$ in zero field.

Preferred magnetocaloric materials of the present invention exhibit a magnetic phase transition of first order nature. The first order nature of the magnetic phase transition is evidenced by a more than linear variation of the magnetization upon application of an external magnetic field in the vicinity of the Curie temperature Tc.

In a further aspect, the present invention provides a process for producing a magnetocaloric material according to the present invention. Said process comprises the following steps:

(a) providing a mixture of precursors comprising atoms of the elements manganese, iron, silicon, phosphorus, nitrogen, and optionally boron, wherein in said mixture of precursors the stoichiometric ratio of the total amounts of atoms of said elements corresponds to the stoichiometric ratio of the atoms of said elements in the magnetocaloric material produced in the process, and (b) reacting the mixture provided in step (a) in the solid and/or liquid phase obtaining a solid or liquid reaction product, and if the reaction product is a liquid reaction product, transferring the liquid reaction product into the solid phase obtaining a solid reaction product, and (c) optionally shaping of the solid reaction product obtained in step (b) to obtain a shaped solid reaction product, and (d) heat treatment of the solid reaction product obtained in step (b) or the shaped solid reaction product obtained in step (c) to obtain a heat treated product, and (e) cooling the heat treated product obtained in step (d) to obtain a cooled product, and (f) optionally shaping of the cooled product obtained in step (e).

In the mixture of precursors to be provided in step (a) the stoichiometric ratio of the total amounts of atoms of the elements manganese, iron, silicon, phosphorus, nitrogen, and optionally boron is adjusted so that it corresponds to the stoichiometric ratio of the atoms of said elements in the magnetocaloric material to be produced in the process. The total amount of atoms of an element in said mixture of precursors is the sum of the amounts of atoms of said element in all precursors present in said mixture which contain said element.

In the mixture of precursors, manganese, iron, silicon, phosphorus and optionally boron are present in elemental form and/or in the form of a compound comprising one or more of said elements, preferably a compound consisting of two or more of said elements or of one of said elements and nitrogen. In the mixture of precursors, nitrogen is preferably present in the form of one or more compounds wherein nitrogen has a negative oxidation number.

The mixture of precursors to be provided in step (a) preferably comprises one more substances selected from the group consisting of elemental manganese, elemental iron, elemental silicon, elemental phosphorus, elemental boron, nitrides of iron, borides of iron, borides of manganese, phosphides of iron, phosphides of manganese, ammonia gas and nitrogen gas.

A particularly preferred mixture of precursors comprises or consists of manganese, iron, red phosphorus, silicon, and iron nitrides.

Step (a) is carried out by means of any suitable method. Preferably the precursors are powders, and/or the mixture of precursors is a powder mixture. If necessary, the mixture is ground in order to obtain a microcrystalline powder mixture. Mixing may comprise a period of ball milling which also provides suitable conditions for reacting the mixture of precursors in the solid state in subsequent step (b) (see below).

In step (b) the mixture provided in step (a) is reacted in the solid and/or liquid phase, i.e. reacting is either carried out in the solid phase over the whole duration of step (b) so that a solid reaction product is obtained, or reacting is carried out in the liquid phase over the whole duration of step (b) so that a liquid reaction product is obtained, or reacting according to step (b) comprises one or more periods wherein reacting is carried out in the solid phase and one or more periods wherein reacting is carried out in the liquid phase. In preferred cases the reacting in step (b) consists of a first period wherein reacting is carried out in the solid phase followed by a second period wherein reacting is carried out in the liquid phase so that the reaction product obtained in step (b) is a liquid reaction product. Preferably, step (b) is carried out under a protective gas atmosphere.

In a preferred process according to the present invention, in step (b) reacting of the mixture comprises reacting of the mixture in the solid phase by ball-milling so that a reaction product in the form of a powder is obtained.

In another preferred process according to the present invention, in step (b) reacting of the mixture comprises reacting of the mixture in the liquid phase by melting together the mixture of precursors, e.g. in an induction oven, preferably under a protecting gas (e.g. argon) atmosphere and/or in a closed vessel.

In those cases where the reaction product obtained in step (b) is a liquid reaction product, step (b) also comprises transferring said liquid reaction product into the solid phase obtaining a solid reaction product. Transferring said liquid reaction product into the solid phase is carried out by means of any suitable method, e.g. by quenching, melt-spinning or atomization.

Quenching means cooling of the liquid reaction product obtained in step (b) in such manner that the temperature of said liquid reaction product decreases faster than it would decrease in contact with resting air.

In melt spinning the liquid reaction product obtained in step (b) is sprayed onto a cold rotating metal roll or drum. Typically the drum or roll is made from copper. Spraying is achieved by means of elevated pressure upstream of the spray nozzle or reduced pressure downstream of the spray nozzle. Typically the rotating drum or roll is cooled. The drum or roll preferably rotates at a surface speed of 10 to 40 m/s, especially from 20 to 30 m/s. On the drum or roll, the liquid composition is cooled at a rate of preferably from $10^2$ to $10^7$ K/s, more preferably at a rate of at least $10^4$ K/s, especially with a rate of from 0.5 to $2*10^6$ K/s. Preferably, melt spinning is carried out under a protecting gas (e.g. argon) atmosphere.

Atomization corresponds to mechanical disintegration of the liquid reaction product obtained in step (b) into small droplets, e.g. by means of a water jet, an oil jet, a gas jet, centrifugal force or ultrasonic energy. The droplets solidify and are collected on a substrate.

In a preferred process according to the present invention, in step (b) reacting of the mixture comprises reacting of the mixture in the liquid phase (e.g. by melting together the mixture of precursors), and transferring the obtained liquid reaction product into the solid phase is carried out by quenching, melt-spinning or atomization.

Step (c) is carried out by means of any suitable method. For instance, when the reaction product obtained in step (b) is a powder, in step (c) said powder obtained in step (b) is shaped by pressing, molding, rolling, extrusion (especially hot extrusion) or metal injection molding.

Step (d) is carried out by means of any suitable method. In step (d) the maximum temperature to which the solid reaction product obtained in step (b) or the shaped solid reaction product obtained in step (c) is exposed is below the melting temperature of the solid reaction product obtained in step (b) or the shaped solid reaction product obtained in step (c). Step (d) is performed in order to cure structural defects and to thermodynamically stabilize the reaction product obtained in step (b), and/or to strengthen and compact the shaped solid reaction product obtained in step (c) by fusing together the material grains.

Preferably, in step (d) the heat treatment comprises sintering the solid reaction product obtained in step (b) or the shaped solid reaction product obtained in step (c), preferably under a protective gas atmosphere.

In particularly preferred processes according to the present invention, in step (d) the heat treatment includes
- sintering the solid reaction product obtained in step (b) or the shaped solid reaction product obtained in step (c) at a temperature in the range of from 1000° C. to 1200° C.
- optionally annealing of the sintered product at a temperature in the range of from 750° C. to 950° C.
- cooling down of the sintered and optionally annealed product to room temperature with cooling rates up to 100 K/s
- optionally re-heating the cooled product and re-sintering at a temperature in the range of from 1000° C. to 1200° C.

Further preferably in step (d) the heat treatment includes
- sintering the shaped solid reaction product obtained in step (c) at a temperature in the range of from 1000° C. to 1200° C.
- annealing of the sintered product at a temperature in the range of from 750° C. to 950° C.

cooling down of the sintered and annealed product to room temperature with cooling rates up to 100 K/s
re-heating the cooled product and re-sintering at a temperature in the range of from 1000° C. to 1200° C.

In this preferred mode of carrying out step (d), during the stage of sintering the material grains are fused together so that the cohesion between the material grains of the shaped solid reaction product is increased and the porosity is reduced, and during the stage of annealing, the crystal structure is homogenized and crystal defects are cured.

Within step (d), cooling down of the sintered and optionally annealed product may be carried out by turning off the oven (known to the specialist as "oven cooling").

Step (e) is carried out by means of any suitable method. In a preferred process according to the present invention, step (e) includes contacting the heat treated product obtained in step (d) with a liquid or gaseous medium, preferably at a quenching rate of 200 K/s or less, preferably ≤100 K/s or less, most preferably ≤25 K/s.

Particularly preferably, quenching is carried out by means of contacting the heat treated product obtained in step (d) with water or aqueous liquids, for example cooled water or ice/water mixtures. For example, the heat treated product obtained in step (d) is allowed to fall into ice-cooled water. It is also possible to quench the heat treated product obtained in step (d) with sub-cooled gases such as liquid nitrogen.

By cooling in liquid nitrogen, the virgin effect of the pristine magnetocaloric material is removed. It is important to note that pristine magnetocaloric materials according to the present invention remain in their physical form when cooled in liquid nitrogen compared to pristine magnetocaloric materials consisting of iron, manganese, silicon and phosphorus (i.e. not containing nitrogen) which are easily fragmented. In other words, the presence of nitrogen appears to provide for improved mechanical stability of magnetocaloric materials comprising iron, manganese, silicon and phosphorus.

Step (f) is carried out by means of any suitable method. For instance, when the cooled product obtained in step (e) is in a shape not suitable for the desired technical application (e.g. in the form of a powder), in step (f) said cooled product obtained in step (e) is transferred into a shaped body by means of pressing, molding, rolling, extrusion (especially hot extrusion) or metal injection molding. Alternatively, the cooled product obtained in step (e) which is in the form of a powder or has been transferred into the form of a powder is mixed with a binding agent, and said mixture is transferred into a shaped body in step (f). Suitable binding agents are oligomeric and polymeric binding systems, but it is also possible to use low molecular weight organic compounds, for example sugars. The shaping of the mixture is achieved preferably by casting, injection molding or by extrusion. The binding agent either remains in the shaped body or is removed catalytically or thermally so that a porous body with monolith structure is formed.

Preferred processes according to the present invention are those which exhibit two or more of the above-defined preferred features in combination.

In a further aspect, the present invention relates to the use of a magnetocaloric material according to the present invention in a device selected from the group consisting of cooling systems, heat exchangers, heat pumps, thermomagnetic generators and thermomagnetic switches. Preferably, said magnetocaloric material is one of the preferred magnetocaloric materials described above.

In a further aspect, the present invention relates to a device selected from the group consisting of cooling systems, heat exchangers, heat pumps, thermomagnetic generators and thermomagnetic switches, wherein said device comprises at least one magnetocaloric material according to the present invention. Preferably, said magnetocaloric material is one of the preferred magnetocaloric materials described above.

The present invention is hereinbelow further illustrated by the following examples.

EXAMPLES

Preparation of Magnetocaloric Materials
Step (a)

For the preparation of the magnetocaloric materials according to the present invention listed in table 1, in each case 15 g of a mixture consisting of the precursors elemental manganese, elemental iron, iron nitride (nominal composition approximately $Fe_3N$), elemental red phosphorus, elemental silicon and optionally elemental boron (each in the form of a powder) in the amounts (in gram) given in table 1 was provided. For the preparation of comparison materials not according to the present invention, a mixture consisting of the precursors elemental manganese, elemental iron, elemental red phosphorus and elemental silicon (each in the form of a powder) was provided as indicated in table 1.

In the precursor mixtures, the proportions of the precursors are adjusted so that the stoichiometric ratio of the total amounts of atoms of iron, manganese, phosphorus, silicon, nitrogen (if present) and boron (if present) corresponds to the stoichiometric ratio of the atoms of iron, manganese, phosphorus, silicon, nitrogen (if present) and boron (if present) in the magnetocaloric material to be produced (formula in the column "composition" in table 1).

Step (b)

Magnetocaloric materials according to the present invention were prepared by reacting the mixtures provided in step (a) in the solid phase using a planetary ball mill (Fritsch Pulverisette) with four grinding bowl fasteners. Each grinding bowl (80 ml volume) contains seven balls (10 mm diameter) made of tungsten carbide and 15 grams of a mixture of precursors prepared in step (a). The mixtures were ball milled for 10 hours with a constant rotation speed of 380 rpm in an argon atmosphere. (The total time in the ball mill is 16.5 hours, the machine stops milling for 10 minutes after every 15 minutes of milling).

Step (c)

After ball-milling the obtained reaction product which is in the form or a powder was compacted to small tablets (diameter 12 mm, height 5-10 mm) in a hydraulic pressing system with a pressure of 1.47 kPa (150 kgf $cm^{-2}$).

Step (d)

After pressing, the tablets were sealed inside quartz ampoules in an argon atmosphere of 20 kPa (200 mbar). Then, the samples were sintered at 1100° C. for 2 h and annealed at 850° C. for 20 h and then cooled down slowly to room temperature by turning off the oven (known to the specialist as "oven cooling") before re-sintering at 1100° C. for 20 h to achieve a homogeneous composition.

Step (e)

The thermal treatment of step (d) was finished by contacting the ampoules with water.

The composition of magnetocaloric materials prepared in the above-described manner and the composition of the corresponding precursor mixtures is given in table 1 below:

TABLE 1

| Composition | Mn/[g] | Fe/[g] | Iron nitride $Fe_{2-4}N$/[g] | P/[g] | Si/[g] | B/[g] |
|---|---|---|---|---|---|---|
| $Mn_{1.25}Fe_{0.7}P_{0.5}Si_{0.5}$ (comparison example) | 7.5022 | 4.2712 | 0.0000 | 1.6916 | 1.5430 | 0.0000 |
| $Mn_{1.25}Fe_{0.7}P_{0.5}Si_{0.5}N_{0.01}$ | 7.4952 | 4.1026 | 0.1793 | 1.6907 | 1.5329 | 0.0000 |
| $Mn_{1.25}Fe_{0.7}P_{0.5}Si_{0.5}N_{0.03}$ | 7.4795 | 3.7655 | 0.5386 | 1.6851 | 1.5296 | 0.0000 |
| $Mn_{1.25}Fe_{0.7}P_{0.5}Si_{0.5}N_{0.05}$ | 7.4648 | 3.4296 | 0.8963 | 1.6830 | 1.5266 | 0.0000 |
| $Mn_{1.25}Fe_{0.7}P_{0.5}Si_{0.5}N_{0.07}$ | 7.4496 | 3.0959 | 1.2534 | 1.6800 | 1.5230 | 0.0000 |
| $Mn_{1.25}Fe_{0.7}P_{0.49}Si_{0.5}N_{0.01}$ | 7.5127 | 4.1116 | 0.1810 | 1.6604 | 1.5362 | 0.0000 |
| $Mn_{1.25}Fe_{0.7}P_{0.47}Si_{0.5}N_{0.03}$ | 7.5309 | 3.7907 | 0.5425 | 1.5963 | 1.5399 | 0.0000 |
| $Mn_{1.25}Fe_{0.7}P_{0.43}Si_{0.5}N_{0.07}$ | 7.5685 | 3.1455 | 1.2709 | 1.4680 | 1.5477 | 0.0000 |
| $Mn_{1.25}Fe_{0.7}P_{0.5}Si_{0.49}N_{0.01}$ | 7.5107 | 4.1110 | 0.1809 | 1.6932 | 1.5053 | 0.0000 |
| $Mn_{1.25}Fe_{0.7}P_{0.5}Si_{0.47}N_{0.03}$ | 7.5256 | 3.7890 | 0.5418 | 1.6976 | 1.4465 | 0.0000 |
| $Mn_{1.25}Fe_{0.7}P_{0.5}Si_{0.45}N_{0.05}$ | 7.5413 | 3.4659 | 0.9048 | 1.7007 | 1.3876 | 0.0000 |
| $MnFe_{0.95}P_{0.45}Si_{0.55}N_{0.02}$ | 5.9865 | 5.4528 | 0.3591 | 1.5186 | 1.6833 | 0.0000 |
| $MnFe_{0.95}P_{0.44}Si_{0.5}B_{0.06}N_{0.02}$ | 6.0332 | 5.4950 | 0.3616 | 1.4966 | 1.5422 | 0.0714 |
| $Mn_{1.25}Fe_{0.70}P_{0.47}Si_{0.53}$ (comparison example) | 7.6037 | 4.1360 | 0.0000 | 1.6118 | 1.6484 | 0.0000 |
| $Mn_{1.25}Fe_{0.70}P_{0.47}Si_{0.53}N_{0.01}$ | 7.4998 | 4.0795 | 0.2051 | 1.5898 | 1.6259 | 0.0000 |

Sample Preparation and Characterization of Magnetocaloric Materials

The magnetocaloric materials prepared as described above were cooled in liquid nitrogen to remove the virgin effect. Then the magnetocaloric materials were manually crushed by means of a mortar to prepare powders for the measurements. Most interestingly, pristine magnetocaloric materials according to the present invention remain in their physical form when cooled in liquid nitrogen compared to pristine magnetocaloric materials consisting of iron, manganese, silicon and phosphorus (i.e. not containing nitrogen) that are easily fragmented. In other words, the presence of nitrogen appears to provide for improved mechanical stability of magnetocaloric materials comprising iron, manganese, silicon and phosphorus.

The crystalline structure of all samples was characterized by X-ray power diffraction using a PANalytical X-pert Pro diffractometer with Cu—$K_\alpha$ radiation. The refinements have been done using the Fullprof program.

A differential scanning calorimeter (DSC) equipped with a liquid nitrogen cooling system was used to measure the specific heat. The measurements were conducted with a sweep rate of 10 K/min. The Curie temperatures Tc were determined from DSC zero field measurements (heating curves.)

Magnetic measurements were performed using the Reciprocating Sample Option (RSO) mode in a Superconducting Quantum Interference Device (SQUID) magnetometer (Quantum Design MPMS 5XL). The magnetic entropy change $\Delta S_m$ is derived from the isofield magnetization measurements using the Maxwell relation.

Results

Crystal Structure

FIG. 1 shows the powder X-ray diffraction (XRD) patterns measured at 150 and 500 K (in the ferromagnetic and paramagnetic state, respectively) of materials of formula $Mn_{1.25}Fe_{0.70}P_{0.5}Si_{0.5}N_z$ with z=0.00, 0.01, 0.03, 0.05 and 0.07. All samples exhibit the hexagonal $Fe_2P$-type crystal structure and, as often observed in this material family, display a small amount of $(Mn,Fe)_3Si$ and MnO as impurity phases. With increasing nitrogen content the X-ray pattern gradually changes. No additional reflections are observed, indicating that the nitrogen is fully accommodated in the $Fe_2P$-type of structure.

Figure 2:
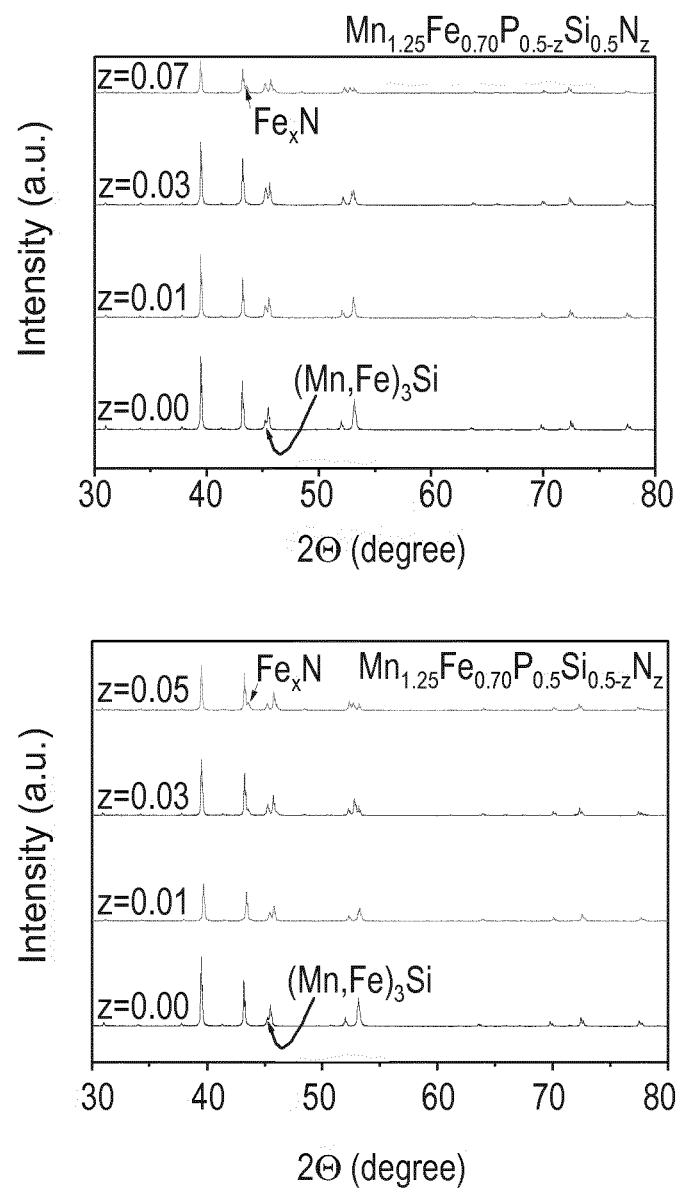
FIG. 2 shows the powder X-ray diffraction (XRD) patterns for materials of formula $Mn_{1.25}Fe_{0.70}P_{0.5-z}Si_{0.5}N_z$ with z=0.00, 0.01, 0.03 and 0.07 (top) and for materials of formula $Mn_{1.25}Fe_{0.70}P_{0.5}Si_{0.5-z}N_z$ with z=0.00, 0.01, 0.03 and 0.05 (bottom).

FIG. 2 shows the powder X-ray diffraction (XRD) patterns for materials of formula $Mn_{1.25}Fe_{0.70}P_{0.5-z}Si_{0.5}N_z$ with z=0.00, 0.01, 0.03 and 0.07 (top) and for materials of formula $Mn_{1.25}Fe_{0.70}P_{0.5}Si_{0.5-z}N_z$ with z=0.00, 0.01, 0.03 and 0.05 (bottom). In these materials either phosphorus atoms or silicon atoms of the corresponding parent material $Mn_{1.25}Fe_{0.70}P_{0.5}Si_{0.5}$ (z=0) are substituted by nitrogen atoms. The substitution of phosphorus atoms as well as of silicon atoms by nitrogen atoms does not result in a structural change relative to the corresponding parent material (z=0) when z=0.01. However, for z≥0.03 a $Fe_xN$ impurity phase is observed.

In FIGS. 1 and 2, the expression "a.u." means "arbitrary units".

Magnetocaloric Behavior

Figure 3:
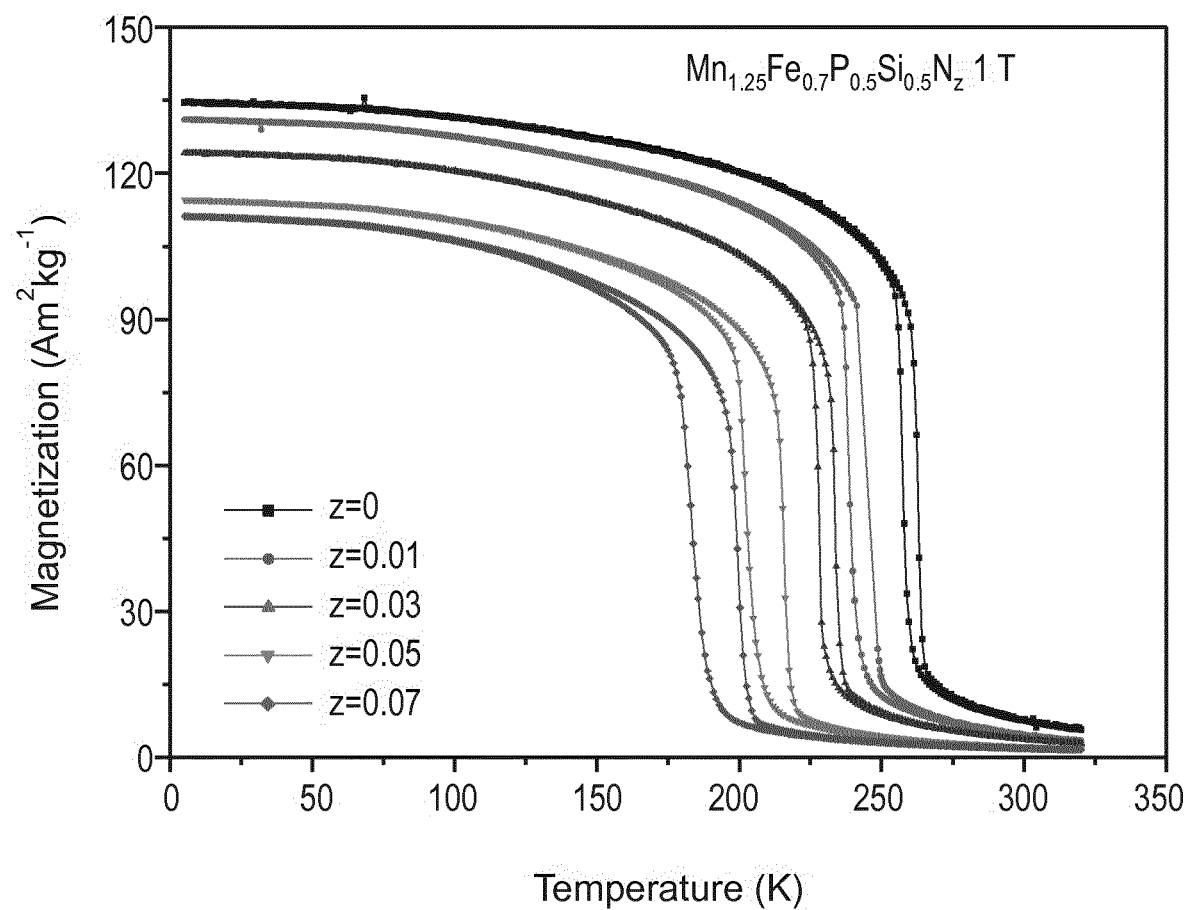
FIG. 3 shows the temperature dependence of the magnetization (magnetization curves) recorded on cooling and heating (sweeping rate 2 k/min) in a magnetic field of 1 T of materials of formula $Mn_{1.25}Fe_{0.70}P_{0.5}Si_{0.5}N_z$ with z=0.00, 0.01, 0.03, 0.05 and 0.07

FIG. 3 shows the temperature dependence of the magnetization (magnetization curves) recorded on cooling and heating (sweeping rate 2 k/min) in a magnetic field of 1 T of materials of formula $Mn_{1.25}Fe_{0.70}P_{0.5}Si_{0.5}N_z$ with z=0.00, 0.01, 0.03, 0.05 and 0.07. The Curie temperature Tc decreases with increasing nitrogen content. On the other hand, increase of the nitrogen content leads to a gradual decrease in the spontaneous magnetization and a slight increase in thermal hysteresis. However, the hysteresis of all materials is relatively small thus revealing first-order nature of the magnetic transitions, which usually leads to a large magnetocaloric effect.

Figure 4A:
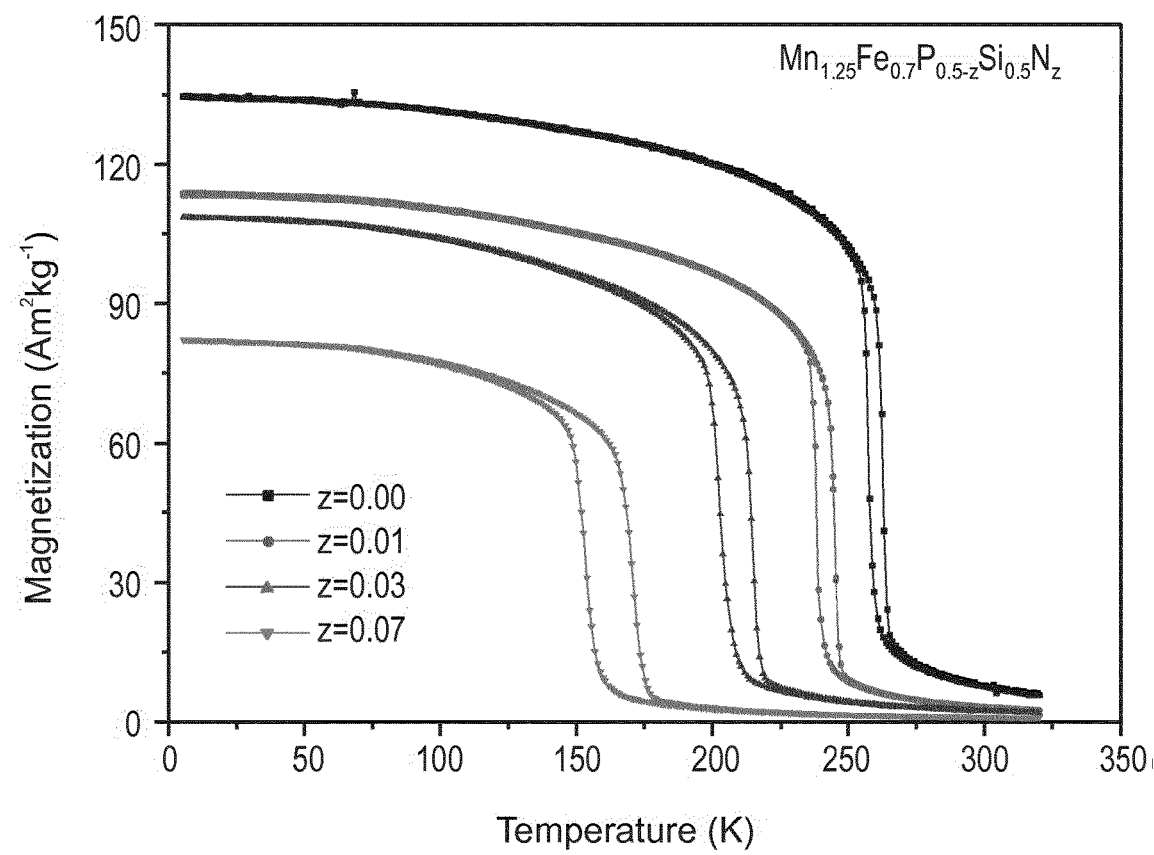
FIGS. 4A and 4B show the temperature dependence of the magnetization (magnetization curves) recorded on cooling and heating (sweeping rate 2 k/min) in a magnetic field of 1 T for materials of formula $Mn_{1.25}Fe_{0.70}P_{0.5-z}Si_{0.5}N_z$ with z=0.00, 0.01, 0.03 and 0.07 (FIG. 4A) and for materials of formula $Mn_{1.25}Fe_{0.70}P_{0.5}Si_{0.5-z}N_z$ with z=0.00, 0.01, 0.03 and 0.05 (FIG. 4B).
Figure 4B:
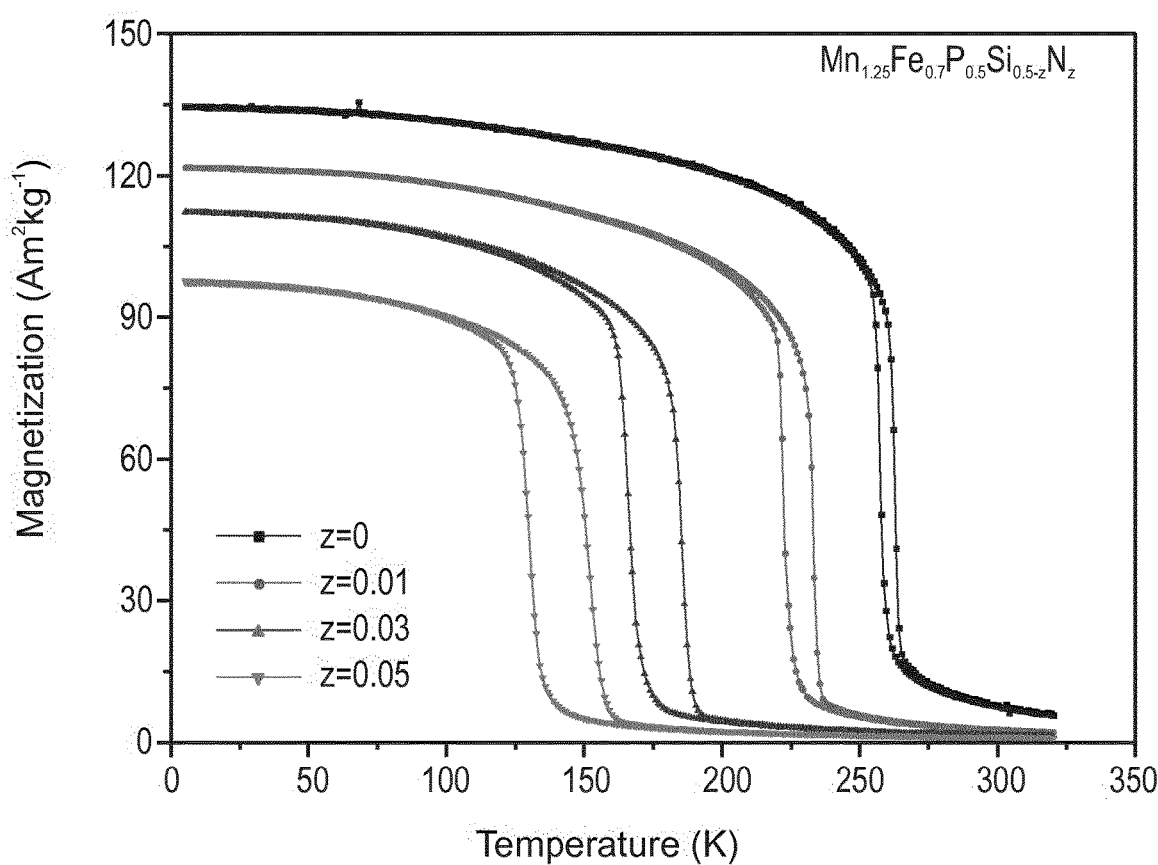

FIGS. 4A and 4B show the temperature dependence of the magnetization (magnetization curves) recorded on cooling and heating (sweeping rate 2 k/min) in a magnetic field of 1 T for materials of formula $Mn_{1.25}Fe_{0.70}P_{0.5-z}Si_{0.5}N_z$ with z=0.00, 0.01, 0.03 and 0.07 (FIG. 4A) and for materials of formula $Mn_{1.25}Fe_{0.70}P_{0.5}Si_{0.5-z}N_z$ with z=0.00, 0.01, 0.03 and 0.05 (FIG. 4B). The Curie temperature Tc as well as the spontaneous magnetization decreases faster with increasing nitrogen content, compared to the results shown in FIG. 3. Again, increase of the nitrogen content leads to a slight increase in thermal hysteresis.

The parameters Curie temperature Tc, thermal hysteresis $\Delta T_{hys}$ and magnetic entropy change $\Delta S_m$ of the materials according to the invention and comparison materials ($Mn_{1.25}Fe_{0.7}P_{0.5}Si_{0.5}$ and $Mn_{1.25}Fe_{0.70}P_{0.47}Si_{0.53}$) are listed in table 2 hereinbelow:

TABLE 2

| Composition | $T_c$ [K] | $\Delta T_{Hys}$ from DSC [K] | $\Delta Sm$ [Jkg−1K−1] |
|---|---|---|---|
| $Mn_{1.25}Fe_{0.7}P_{0.5}Si_{0.5}$ | 260 | 4.80 | 13.75 |
| $Mn_{1.25}Fe_{0.7}P_{0.5}Si_{0.5}N_{0.01}$ | 245 | 5.40 | 14.59 |
| $Mn_{1.25}Fe_{0.7}P_{0.5}Si_{0.5}N_{0.03}$ | 232 | 5.60 | 13.80 |
| $Mn_{1.25}Fe_{0.7}P_{0.5}Si_{0.5}N_{0.05}$ | 214 | 10.43 | 13.67 |
| $Mn_{1.25}Fe_{0.7}P_{0.5}Si_{0.5}N_{0.07}$ | 197 | 11.82 | 9.94 |
| $Mn_{1.25}Fe_{0.7}P_{0.49}Si_{0.5}N_{0.01}$ | 245 | 7.96 | |
| $Mn_{1.25}Fe_{0.7}P_{0.47}Si_{0.5}N_{0.03}$ | 214 | 10.26 | |
| $Mn_{1.25}Fe_{0.7}P_{0.43}Si_{0.5}N_{0.07}$ | 170 | 14.82 | |
| $Mn_{1.25}Fe_{0.7}P_{0.5}Si_{0.49}N_{0.01}$ | 233 | 9.4 | |
| $Mn_{1.25}Fe_{0.7}P_{0.5}Si_{0.47}N_{0.03}$ | 185 | 15.37 | |
| $Mn_{1.25}Fe_{0.7}P_{0.5}Si_{0.45}N_{0.05}$ | 151 | 22 | |
| $Mn_{1.25}Fe_{0.70}P_{0.47}Si_{0.53}$ | 288 | 4.3 | 17.7 |
| $Mn_{1.25}Fe_{0.70}P_{0.47}Si_{0.53}N_{0.01}$ | 280 | 3.4 | 14.8 |
| $MnFe_{0.95}P_{0.45}Si_{0.55}N_{0.02}$ | 380 | 16 | |
| $MnFe_{0.95}P_{0.44}Si_{0.5}B_{0.06}N_{0.02}$ | 400 | 1 | |

From the last two samples in table 2 it is evident that presence of boron in certain cases results in a decrease of the thermal hysteresis.

Mechanical Stability

Figure 5:
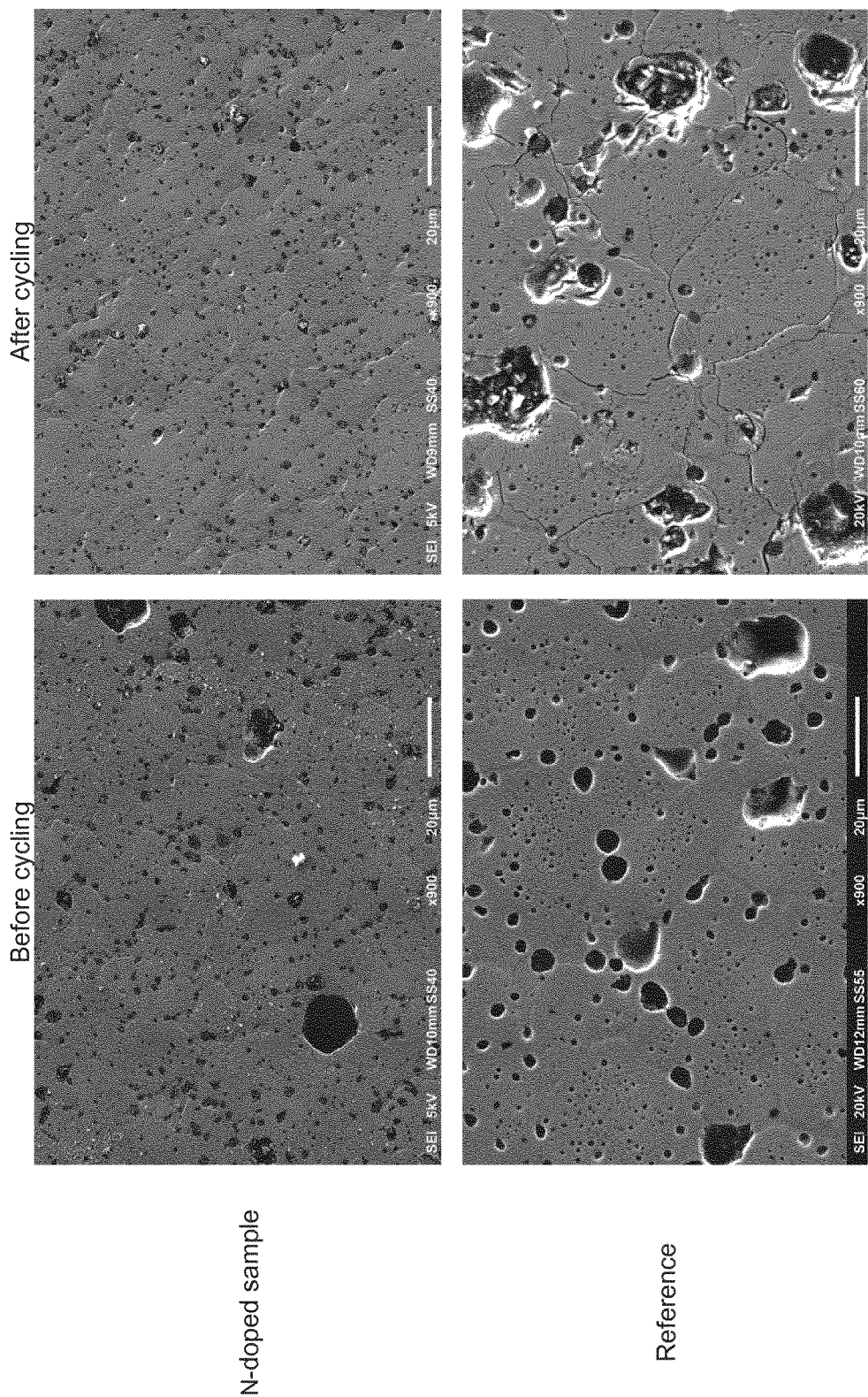
FIG. 5 demonstrates the effect of the presence of nitrogen atoms on the mechanical stability of magnetocaloric materials comprising manganese, iron, silicon and phosphorus when said materials are subject to thermal cycling. SEM (scanning electron microscopy) images of material samples were taken before thermal cycling (left part of FIG. 5) and after thermal cycling (right part of FIG. 5

FIG. 5 demonstrates the effect of the presence of nitrogen atoms on the mechanical stability of magnetocaloric materials comprising manganese, iron, silicon and phosphorus when said materials are subject to thermal cycling. SEM (scanning electron microscopy) images of material samples were taken before thermal cycling (left part of FIG. 5) and after thermal cycling (right part of FIG. 5). In each case three thermal cycles between −50° C. and +50° C. were performed at a heating rate resp. cooling rate of 0.5 K/min.

The upper part of FIG. 5 shows SEM images (left side—before thermal cycling, right side—after three thermal cycles as defined above) of a sample of a material according to the invention having the composition $Mn_{1.25}Fe_{0.70}P_{0.47}Si_{0.53}N_{0.01}$. The lower part of FIG. 5 shows SEM images (left side—before thermal cycling, right side—after three thermal cycles as defined above) of a sample of a comparison material having the composition $Mn_{1.25}Fe_{0.70}P_{0.47}Si_{0.53}$.

While the SEM image of the sample of the comparison material show that wide deep cracks have formed during thermal cycling, the SEM image of the sample of the material according to the invention does not show such cracks after thermal cycling. This is a further evidence that in magnetocaloric materials which comprise manganese, iron, silicon and phosphorus the presence of nitrogen atoms enhances the mechanical stability, compared to magnetocaloric materials comprising manganese, iron, silicon and phosphorus which do not comprise nitrogen atoms.

EMBODIMENTS

1. A magnetocaloric material comprising
   manganese, and
   iron, and
   silicon, and
   phosphorus, and
   nitrogen, and
   optionally boron.
2. A magnetocaloric material according to embodiment 1
   wherein the magnetocaloric material exhibits a hexagonal crystalline structure of the $Fe_2P$ type with a crystal lattice having the space group P-62m
   wherein nitrogen atoms occupy crystal sites and/or interstitial sites of said crystal lattice
   and wherein boron atoms if present occupy crystal sites of said crystal lattice according to the hexagonal crystal system with the space group P-62m, preferably 1b sites.
3. A magnetocaloric material according to embodiment 2, wherein
   nitrogen atoms occupy
      crystal sites of said crystal lattice having the space group P-62m, preferably crystal sites selected from the group consisting of 1b and 2c sites,
   and/or
      interstitial sites of said crystal lattice having the space group P-62m, preferably interstitial sites selected from the group consisting of 6k and 6j sites.
4. The magnetocaloric material according to any preceding embodiment, wherein the magnetocaloric material has a composition according to the general formula (I)

$$(Mn_xFe_{1-x})_{2+u}P_ySi_vN_zB_w \quad (I)$$

wherein
$-0.1 \le u \le 0.1$, preferably $-0.05 \le u \le 0.05$
$0.2 \le x \le 0.8$, preferably $0.3 \le x \le 0.7$, more preferably $0.35 \le x \le 0.65$
$0.3 \le y \le 0.75$, preferably $0.4 \le y \le 0.7$
$0.25 \le v \le 0.7$, preferably $0.3 \le v \le 0.6$
$0 \le w \le 0.1$, preferably $0.04 \le w \le 0.08$
$0.001 \le z \le 0.1$, preferably $0.005 \le z \le 0.07$, more preferably $0.01 \le z \le 0.04$
$y+v+w \le 1$
$y+v+z+w \ge 1$.

5. The magnetocaloric material according to any of embodiments 1 to 4, wherein the magnetocaloric material has a composition according to the general formula (II)

$$(Mn_xFe_{1-x})_{2+u}P_ySi_vN_z \quad (II)$$

wherein
$-0.1 \le u \le 0.1$, preferably $-0.05 \le u \le 0.05$
$0.2 \le x \le 0.8$, preferably $0.3 \le x \le 0.7$, more preferably $0.35 \le x \le 0.65$
$0.3 \le y \le 0.75$, preferably $0.4 \le y \le 0.7$
$0.25 \le v \le 0.7$, preferably $0.3 \le v \le 0.6$
$0.001 \le z \le 0.1$, preferably $0.005 \le z \le 0.07$, more preferably $0.01 \le z \le 0.04$
$y+v \le 1$
$y+v+z \ge 1$
$0.001 \le z \le 0.1$, preferably $0.005 \le z \le 0.07$, more preferably $0.01 \le z \le 0.04$.

6. The magnetocaloric material according to any of embodiments 1 to 4, wherein the magnetocaloric material has a composition according to the general formula (III)

$$(Mn_xFe_{1-})_{2+u}P_ySi_{1-y}N_z \quad (III)$$

wherein
$-0.1 \le u \le 0.1$, preferably $-0.05 \le u \le 0.05$
$0.2 \le x \le 0.8$, preferably $0.3 \le x \le 0.7$, more preferably $0.35 \le x \le 0.65$
$0.3 \le y \le 0.75$, preferably $0.4 \le y \le 0.7$
$0.001 \le z \le 0.1$, preferably $0.005 \le z \le 0.07$, more preferably $0.01 \le z \le 0.04$.

7. The magnetocaloric material according to according to any of embodiments 1 to 4, wherein the magnetocaloric material has a composition according to the general formula (IV)

$$(Mn_xFe_{1-x})_{2+u}P_ySi_{1-y-z}N_z \quad (IV)$$

wherein

−0.1≤u≤0.1, preferably −0.05≤u≤0.05

0.2≤x≤0.8, preferably 0.3≤x≤0.7, more preferably 0.35≤x≤0.65

0.3≤y≤0.75, preferably, 0.4≤y≤0.7

0.001≤z≤0.1, preferably 0.005≤z≤0.07, more preferably 0.01≤z≤0.04.

8. A magnetocaloric material according to any preceding embodiment, wherein the magnetocaloric material is selected from the group consisting of $Mn_{1.25}Fe_{0.7}P_{0.5}Si_{0.5}N_{0.01}$
$Mn_{1.25}Fe_{0.7}P_{0.5}Si_{0.5}N_{0.03}$
$Mn_{1.25}Fe_{0.7}P_{0.49}Si_{0.5}N_{0.01}$
$Mn_{1.25}Fe_{0.7}P_{0.5}Si_{0.49}N_{0.01}$
$Mn_{1.25}Fe_{0.7}P_{0.5}Si_{0.5}N_{0.05}$
$Mn_{1.25}Fe_{0.7}P_{0.5}Si_{0.5}N_{0.07}$
$Mn_{1.25}Fe_{0.7}P_{0.47}Si_{0.5}N_{0.03}$
$Mn_{1.25}Fe_{0.7}P_{0.43}Si_{0.5}N_{0.07}$
$MnFe_{0.95}P_{0.45}Si_{0.55}N_{0.02}$
$MnFe_{0.95}P_{0.44}Si_{0.50}B_{0.06}N_{0.02}$.

9. Process for producing a magnetocaloric material according to any of embodiments 1 to 8, the process comprising the following steps:

(a) providing a mixture of precursors comprising atoms of the elements manganese, iron, silicon, phosphorus, nitrogen, and optionally boron, wherein in said mixture of precursors the stoichiometric ratio of the total amounts of atoms of said elements corresponds to the stoichiometric ratio of the atoms of said elements in the magnetocaloric material produced in the process, and (b) reacting the mixture provided in step (a) in the solid and/or liquid phase obtaining a solid or liquid reaction product, and if the reaction product is a liquid reaction product, transferring the liquid reaction product into the solid phase obtaining a solid reaction product, and (c) optionally shaping of the solid reaction product obtained in step (b) to obtain a shaped solid reaction product, and (d) heat treatment of the solid reaction product obtained in step (b) or the shaped solid reaction product obtained in step (c) to obtain a heat treated product, and (e) cooling the heat treated product obtained in step (d) to obtain a cooled product, and (f) optionally shaping of the cooled product obtained in step (e).

10. Process according to embodiment 9, wherein said mixture of precursors comprises one more substances selected from the group consisting of elemental manganese, elemental iron, elemental silicon, elemental phosphorus, elemental boron, nitrides of iron, borides of iron, borides of manganese, phosphides of iron, phosphides of manganese, ammonia gas and nitrogen gas.

11. Process according to embodiment 9 or 10, wherein in step (b) reacting of the mixture comprises reacting of the mixture in the solid phase by ball-milling so that a reaction product in the form of a powder is obtained.

12. Process according to embodiment 9 or 11, wherein in step (b) reacting of the mixture comprises reacting of the mixture in the liquid phase and transferring the obtained liquid reaction product into the solid phase is carried out by quenching, melt-spinning or atomization.

13. Process according to embodiment 9 to 12, wherein in step (d) the heat treatment comprises sintering the solid reaction product obtained in step (b) or the shaped solid reaction product obtained in step (c).

14. The use of a magnetocaloric material according to any of embodiments 1 to 8 in a device selected from the group consisting of cooling systems, heat exchangers, heat pumps, thermomagnetic generators and thermomagnetic switches.

15. Device selected from the group consisting of cooling systems, heat exchangers, heat pumps, thermomagnetic generators and thermomagnetic switches, wherein said device comprises at least one magnetocaloric material according to any of embodiments 1 to 8.

The invention claimed is:

1. A magnetocaloric material having a chemical composition according to general formula (I):

$$(Mn_xFe_{1-x})_{2+u}P_ySi_vN_zB_w \qquad (I),$$

wherein:
−0.1≤u≤0.1;
0.2≤x≤0.8;
0.3≤y≤0.75;
0.25≤v≤0.7;
0≤w≤0.1;
0.001≤z≤0.1;
y+v+w≤1; and
y+v+z+w≥1.

2. The magnetocaloric material according to claim 1, wherein:
the magnetocaloric material exhibits a hexagonal $Fe_2P$ crystalline structure with a crystal lattice having space group P-62m;
nitrogen atoms occupy crystal sites, interstitial sites of said crystal lattice, or both; and
boron atoms, if present, occupy crystal sites of said crystal lattice, interstitial sites of said crystal lattice, or both according to the hexagonal $Fe_2P$ crystalline structure with space group P-62m.

3. The magnetocaloric material according to claim 2, wherein nitrogen atoms occupy at least one of:
crystal sites of said crystal lattice having space group P-62m, and
interstitial sites of said crystal lattice having space group P-62m.

4. The magnetocaloric material according to claim 1, wherein the magnetocaloric material has a chemical composition according to general formula (I):

$$(Mn_xFe_{1-x})_{2+u}P_ySi_vN_zB_w \qquad (I),$$

wherein:
−0.05≤u≤0.05;
0.3≤x≤0.7;
0.4≤y≤0.7;
0.3≤v≤0.6;
0.04≤w≤0.08;
0.005≤z≤0.07;
y+v+w≤1; and
y+v+z+w≥1.

5. The magnetocaloric material according to claim 1, wherein:
the magnetocaloric material has a chemical composition according to general formula (II):

$$(Mn_xFe_{1-x})_{2+u}P_ySi_vN_z \qquad (II),$$

wherein:
−0.1≤u≤0.1;
0.2≤x≤0.8;
0.3≤y≤0.75;
0.25≤v≤0.7;
y+v≤1;
y+v+z≥1; and
0.001≤z≤0.1.

6. The magnetocaloric material according to claim 1, wherein: the magnetocaloric material has a chemical composition according to general formula (III):

$$(Mn_xFe_{1-x})_{2+u}P_ySi_{1-y}N_z \quad (III),$$

wherein:
−0.1≤u≤0.1;
0.2≤x≤0.8;
0.3≤y≤0.75; and
0.001≤z≤0.1.

7. The magnetocaloric material according to claim 1, wherein: the magnetocaloric material has a chemical composition according to general formula (IV):

$$(Mn_xFe_{1-x})_{2+u}P_ySi_{1-y-z}N_z \quad (IV),$$

wherein:
−0.1≤u≤0.1;
0.2≤x≤0.8;
0.3≤y≤0.75; and
0.001≤z≤0.1.

8. The magnetocaloric material according to claim 1, which is selected from the group consisting of
$Mn_{1.25}F_{0.7}P_{0.5}Si_{0.5}N_{0.01}$,
$Mn_{1.25}Fe_{0.7}P_{0.5}Si_{0.5}N_{0.03}$,
$Mn_{1.25}Fe_{0.7}P_{0.49}Si_{0.5}N_{0.01}$,
$Mn_{1.25}Fe_{0.7}P_{0.5}Si_{0.49}N_{0.01}$,
$Mn_{1.25}Fe_{0.7}P_{0.5}Si_{0.5}N_{0.05}$,
$Mn_{1.25}Fe_{0.7}P_{0.5}Si_{0.5}N_{0.07}$,
$Mn_{1.25}Fe_{0.7}P_{0.47}Si_{0.5}N_{0.03}$,
$Mn_{1.25}Fe_{0.7}P_{0.43}Si_{0.5}N_{0.07}$,
$MnFe_{0.95}P_{0.45}Si_{0.55}N_{0.02}$,
$MnFe_{0.95}P_{0.44}Si_{0.50}B_{0.06}N_{0.02}$, and
$Mn_{1.25}Fe_{0.70}P_{0.47}Si_{0.53}N_{0.01}$.

9. A process for producing the magnetocaloric material according to claim 1, the process comprising: (a) reacting a mixture of precursors in solid phase, liquid phase, or both, to obtain a solid or liquid reaction product, and if the reaction product is a liquid reaction product, transferring the liquid reaction product into solid phase to obtain the solid reaction product; (b) optionally shaping the solid reaction product to obtain a shaped solid reaction product;
(c) heat treating the solid reaction product or the shaped solid reaction product to obtain a heat treated product;
(d) cooling the heat treated product to obtain a cooled product; and
(e) optionally shaping of the cooled product,
wherein:
the mixture of precursors comprises atoms of elements manganese, iron, silicon, phosphorus, nitrogen, and optionally boron; and
a stoichiometric ratio of total amounts of the atoms of the elements corresponds to a stoichiometric ratio of the atoms of the elements in the magnetocaloric material.

10. The process according to claim 9, wherein the mixture of precursors further comprises at least one selected from the group consisting of elemental manganese, elemental iron, elemental silicon, elemental phosphorus, elemental boron, a nitride of iron, a boride of iron, a boride of manganese, a phosphide of iron, a phosphide of manganese, ammonia gas, and nitrogen gas.

11. The process according to claim 9, wherein the reacting of the mixture of precursors comprises reacting the mixture of precursors in solid phase by ball-milling so that a reaction product in powder form is obtained.

12. The process according to claim 9, wherein the reacting of the mixture of precursors comprises reacting the mixture of precursors in liquid phase and transferring the obtained liquid reaction product into solid phase by quenching, melt-spinning, or atomization.

13. The process according to claim 9, wherein the heat treating comprises sintering the solid reaction product or the shaped solid reaction product.

14. A device, comprising the magnetocaloric material of claim 1, wherein the device is selected from the group consisting of a cooling system, a heat exchanger, a heat pump, a thermomagnetic generator, and a thermomagnetic switch.

* * * * *